March 22, 1932.   M. MENNICKE   1,850,131

STEAM BOILER FOR EGGS

Filed Nov. 4, 1929

INVENTOR
MAX MENNICKE
BY
ATTORNEY

Patented Mar. 22, 1932

1,850,131

UNITED STATES PATENT OFFICE

MAX MENNICKE, OF ROCHESTER, NEW YORK

STEAM BOILER FOR EGGS

Application filed November 4, 1929. Serial No. 404,758.

This invention relates to steam cookers and has for its various objects:

To provide such a cooker which is especially adapted for use in cooking eggs.

To provide a steam cooker for eggs in which the heating unit forms part of the cooker.

To provide a construction for such a cooker in which the heating unit is detachably connected thereto.

To provide a cooker in which the eggs are supported above the water level in a suitable tray with which the eggs may be handled before and after the cooking operation.

All these and other objects of this invention will be apparent from the drawings, the specification and the appended claims forming a part thereof.

In the accompanying drawings.

In the several figures of the drawings like reference numerals indicate like parts.

Figure 1:
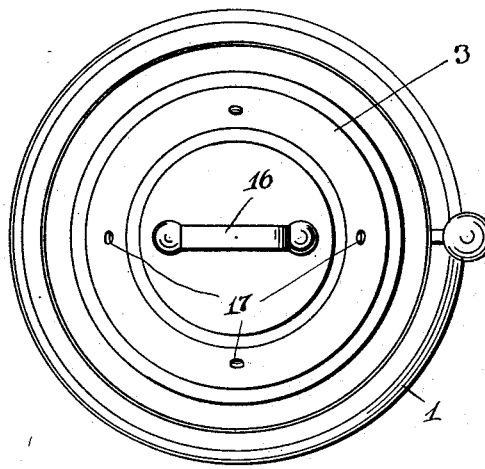
Figure 1 is a top plan view of the steam cooker.

The steam cooker forming the subject matter of my present invention is especially adapted for use in cooking eggs and in its construction is incorporatd an electric heating unit and a tray for handling the eggs making it possible to cook or boil the eggs at any convenient place and with the least trouble in handling them before and after they are cooked. The eggs are placed on the tray before cooking, are held in place in the cooker during the cooking operation, are withdrawn from the cooker, by means of the tray, after being cooked and are then cooled on the tray ready to serve them. The electric heating unit of the cooker is furthermore detachably connected thereto so that after the eggs are cooked the cooker section may be disconnected from the heating unit and filled with cold water in order to cool the eggs directly in the cooker.

As illustrated in the figures the cooking apparatus comprises the base 1, the cooking boiler 2 and the cover 3. Within the cooker is mounted the perforated disc 14 and the egg tray 5. The base 1 is of suitable design to firmly support the boiler 2 and in the base is mounted an electric heating unit (not shown) having the terminals 6 and 7 with which the electric connection is made with the house current. At the top the base is provided with an annular flange 8 which forms a shallow pocket into which nests the bottom of the boiler 2. A pair of pins 9 and 10 located diametrically opposite each other project inwardly from the annular flange 8 and are adapted to engage into the bayonet shaped grooves 11 and 12 formed in the side of the boiler 2 near the bottom thereof. The boiler is set into the pocket of the base so that the pins 9 and 10 first engage the vertical section of the bayonet grooves and slide up into these vertical sections until the boiler rests solidly on the heating unit. A turn of the boiler to one side then moves the pins into the horizontal portion of the bayonet grooves and locks the boiler to the base. The boiler is provided on the side with the handle 2A with which it can be readily handled either with the base and cover or without them.

Intermediate of the wall of the boiler is provided an annular groove which forms a supporting ledge on the inside thereof on which the perforated disc 14 is supported. The disc 14 in turn provides the base for the egg tray 5. The upper end of the boiler is flared outwardly and is provided with a spring flange 15 by which the cover 3 is held in place on top of the boiler. This spring flange is so constructed that a slight force is needed to either place the cover on the boiler or withdraw it from the boiler. In this way the joint between the boiler and the cover is made tight and no steam can escape thru this joint. The cover 3 is dome shaped and on top of it is mounted the handle 16 with which the cover is placed onto the boiler or is withdrawn from it. At suitable points in the dome of the cover are provided the holes 17, 17 thru which the steam from the boiler is allowed to escape.

Figure 3:
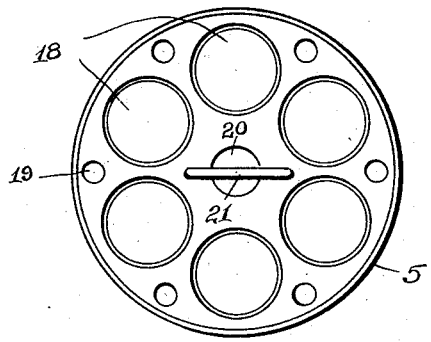
Figure 3 is a top plan view of the egg tray use in the cooker.
Figure 2:
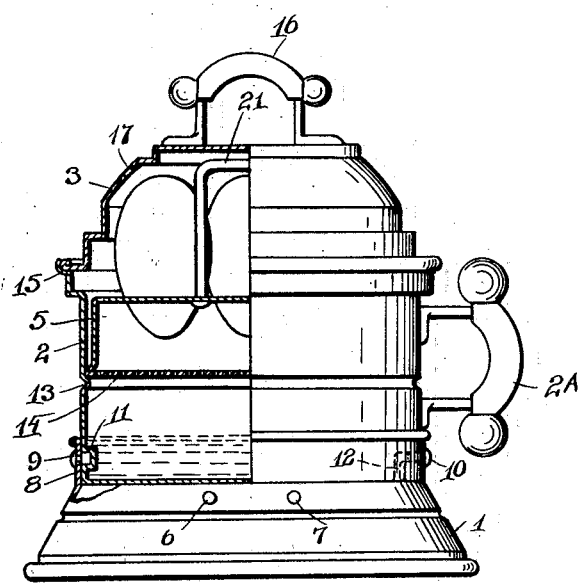
Figure 2 is a partial side elevation and longitudinal section of the steam cooker.
Figure 4:
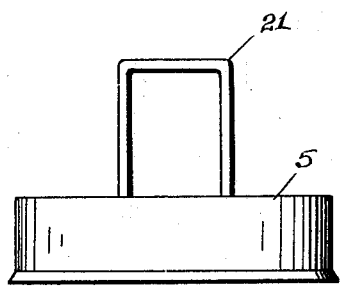
Figure 4 is a side elevation of the egg tray.
Figure 5:
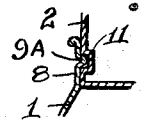
Figure 5 is a sectional view of a slightly modified form of the lock between the base and the cooking boiler.

The tray 5, as illustrated in Figures 2, 3 and 4, comprises an inverted shallow cup having vertical sides with the free edge thereof flaring slightly outwardly. The cup proper of the tray is somewhat smaller in diameter than the inside diameter of the boiler but the outwardly flaring lower edge thereof serves to fill in the gap between the boiler and the tray and centers the tray within the boiler with a uniform space provided between the inside wall of the boiler and the outside wall of the tray. In the top of the tray are provided the holes 18, 18 preferably six in number and in these holes are placed the eggs to be cooked. The diameter of the holes 18 is such that an egg placed into them will approximately have one-third of its body located within the tray and two-thirds above the tray. Besides the holes 18, 18 a series of smaller holes 19, 19 are located near the periphery thereof with a slightly larger hole 20 in the center of the tray. The tray is also provided with a handle 21 in the form of a bail which is mounted centrally of the tray and projects upwardly thereof.

The eggs are placed in the holes of the tray as above described and the tray is then placed into the boiler and supported on the perforated plate 14. Water which has previously been placed into the bottom of the boiler is then brought to boiling by the electric heating unit located in the base 1. The steam which rises from the boiling water passes thru the perforations in the plate 14 and is thus broken up and uniformly distributed over the entire inside of the tray located above the plate 14. The portion of the eggs projecting into the tray are thus exposed to the action of the steam after which the steam escapes thru the holes 19, 19 and hole 20 into the space above the tray where the steam is brought in contact with the portion of the eggs located above the tray. From the inside of the cover the steam can escape thru the openings 17, 17 so as not to confine the steam in the boiler and create a pressure therein.

It has been found in practice that eggs cooked in this way are much more readily cooked than if they were cooked by placing them into boiling water. This is due to the fact that the steam which surrounds the eggs is of uniform temperature and heats the eggs uniformly. After the eggs are cooked the boiler may be unlocked from the base containing the heating unit and cold water placed therein to cool the eggs or the cover of the boiler may be removed and the egg tray with the eggs withdrawn from the boiler and immersed in cold water in order to cool the eggs.

As will be seen from an inspection of Figure 2, the tray 5 is so supported within the boiler that a large portion of the eggs supported by the tray project above the boiler after the cover 3 is removed from the boiler. In this way the eggs are exposed in the boiler as soon as the cover is removed from it and the eggs can be taken hold of and removed from the boiler without withdrawing the tray on which they are supported.

By cooking the eggs which are not perfectly fresh and which would burst when cooked in boiling water, they will not burst when cooked in steam in the boiler forming the subject matter of this invention.

I claim:

1. A steam cooker for eggs comprising a base having a heating unit provided therein, a boiler mounted on top of said base, a supporting ledge provided in said boiler above the water level, a perforated partition supported by said supporting ledge, an egg tray comprising an inverted cup adapted to be mounted on said perforated partition and having holes in the top thereof adapted to support eggs therein with approximately one-third of the body of the eggs located within the tray and two-thirds of the body of the eggs projecting above the tray, a cover closing the top of said boiler and covering said egg tray with the eggs supported therein.

2. A steam boiler for eggs comprising a base having a heating unit mounted therein, a boiler detachably fastened to said base, a perforated partition within said boiler and intermediate thereof, an egg supporting tray comprising an inverted cup, an outwardly flaring edge at the bottom of said tray adapted to center said tray within said boiler with a space surrounding the tray, said tray having openings therein adapted to receive eggs and support them therein with approximately one-third of the body of the eggs located within the tray and two-thirds of the body of the eggs located above the tray, a handle mounted on said tray and projecting above the eggs placed on said tray.

In testimony whereof I affix my signature.

MAX MENNICKE.